United States Patent [19]
Schlegel

[11] 3,720,000
[45] March 13, 1973

[54] TRAILER HITCH GUIDE ASSEMBLY

[76] Inventor: Fred Schlegel, Rural Route No. 1, Box 152(a), Ceresco, Mich. 49033

[22] Filed: July 31, 1970

[21] Appl. No.: 60,067

[52] U.S. Cl. ................................................33/264
[51] Int. Cl. ...............................................G01c 5/00
[58] Field of Search.....33/46 AS; 340/282; 116/28 R

[56] References Cited

UNITED STATES PATENTS

| | | | |
|---|---|---|---|
| 3,363,318 | 1/1968 | Folkins et al. | 336/46 AS |
| 2,815,732 | 12/1957 | Majors | 116/28 R |
| 2,143,997 | 1/1939 | Parkinson | 340/61 |
| 2,407,845 | 9/1946 | Nemeyer | 33/46 AT UX |
| 1,784,466 | 12/1930 | Resonnet | 33/46 AS |
| 2,927,310 | 3/1960 | Knapp | 340/282 |
| 2,984,011 | 5/1961 | Hamilton | 33/46 AS |
| 3,320,920 | 5/1967 | Lusebrink | 116/28 R UX |

Primary Examiner—Robert B. Hull
Attorney—Roy A. Plant

[57] ABSTRACT

A device is provided for assisting an operator in backing up a trailer towing vehicle to couple the ball hitch member mounted on the rear of the vehicle with the complementary socket hitch member mounted on the tongue of the trailer. The device comprises a guide having sighting means such as a ball at the end thereof adapted to be mounted on the towing vehicle and a second guide having target means at the end thereof adapted to be mounted on the tongue of the trailer. When both guides of the device are properly mounted and adjusted, the operator backs the towing vehicle toward the trailer while aiming the sighting ball at the target means. When the sighting ball engages the center of the target means, as indicated by a signal such as the lighting of an electric light bulb or the sound of a buzzer, the vehicle and the trailer are in proper alignment for coupling.

7 Claims, 10 Drawing Figures

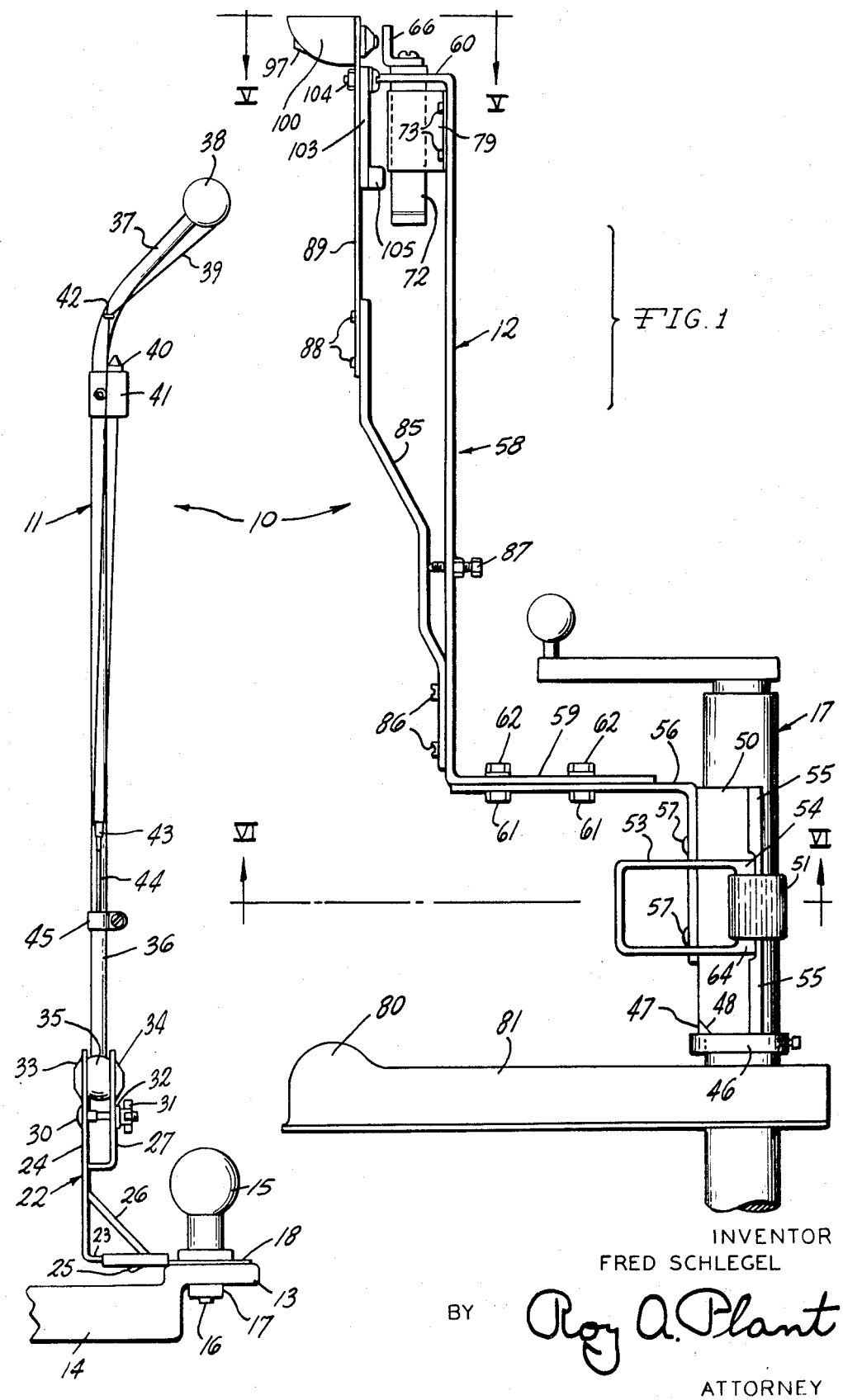

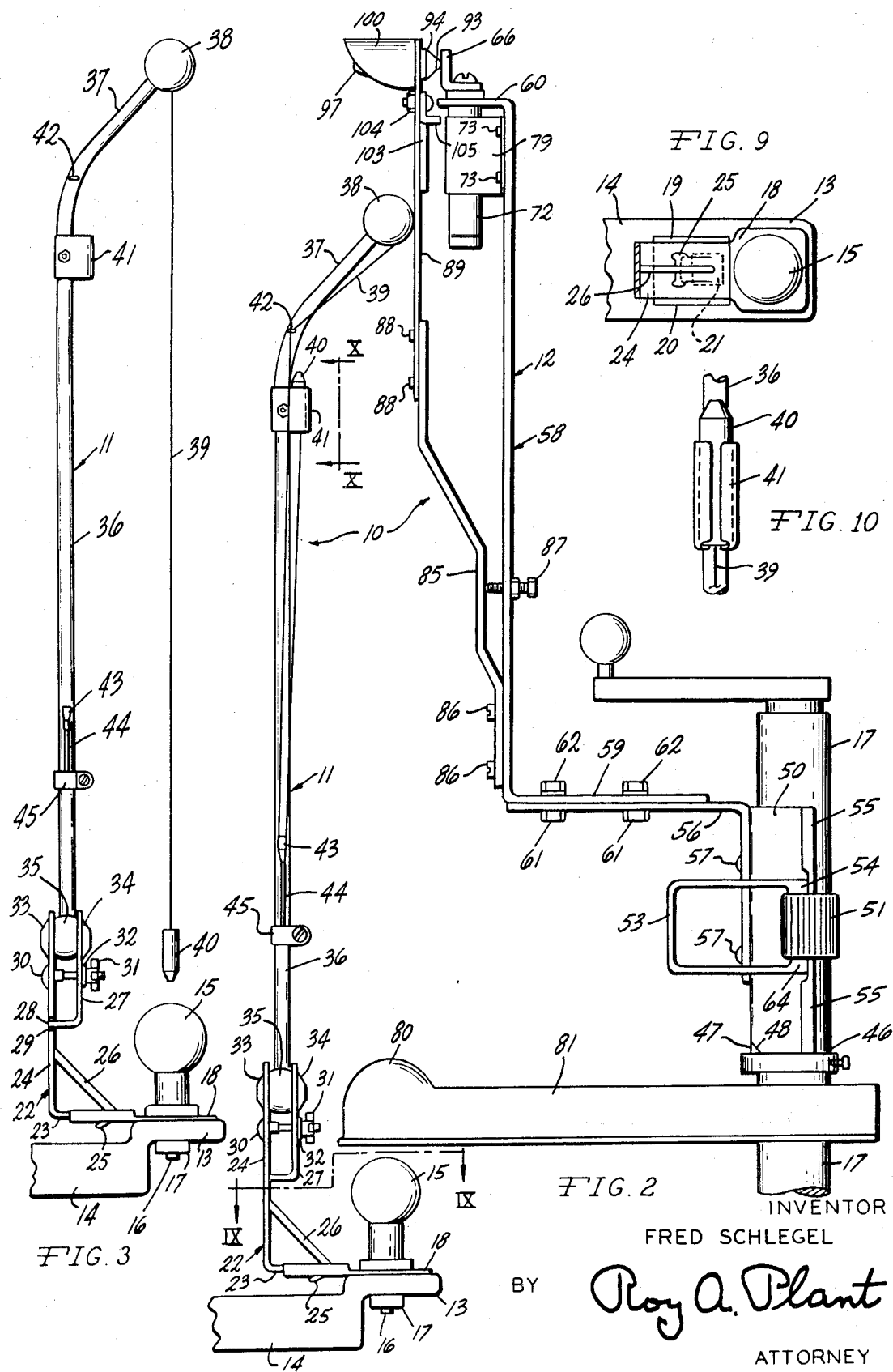

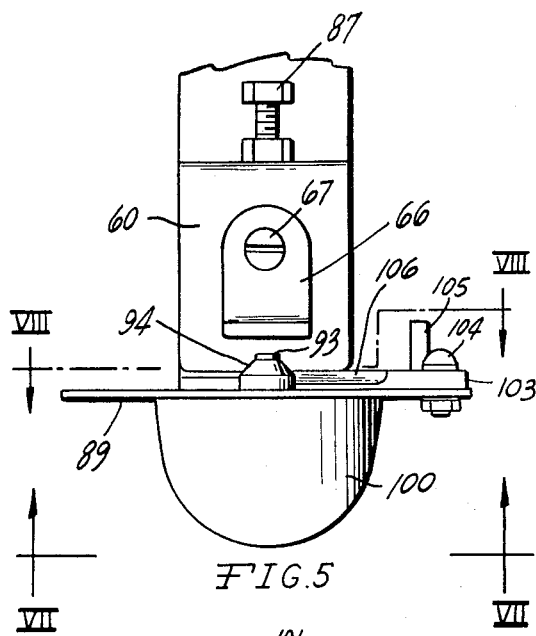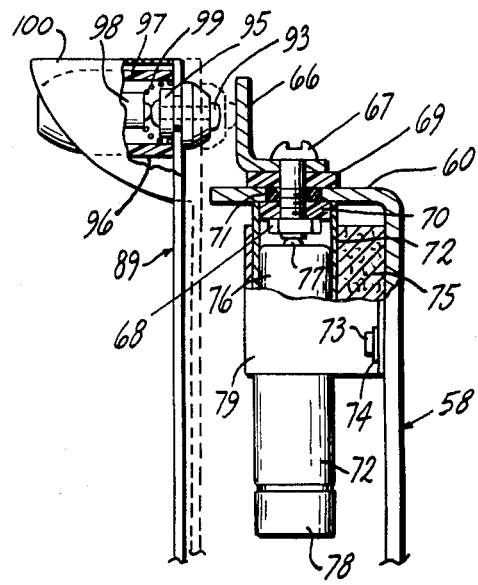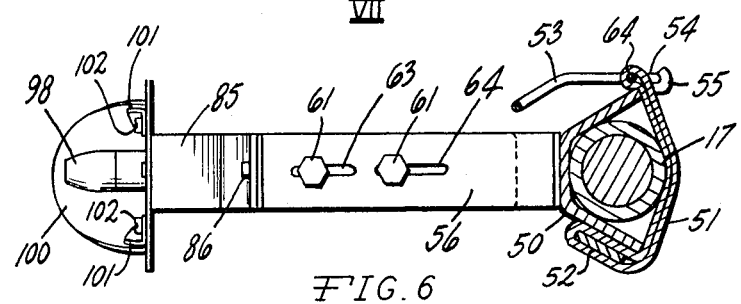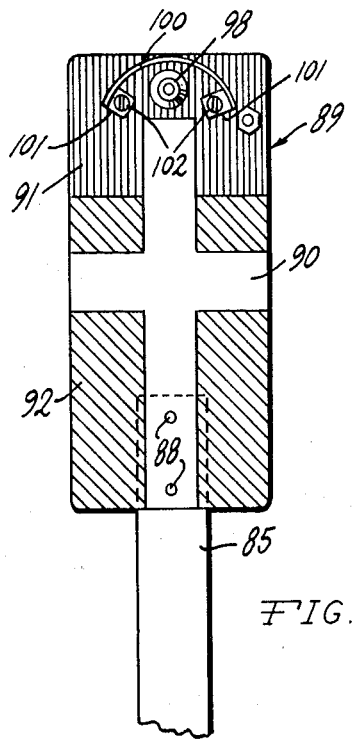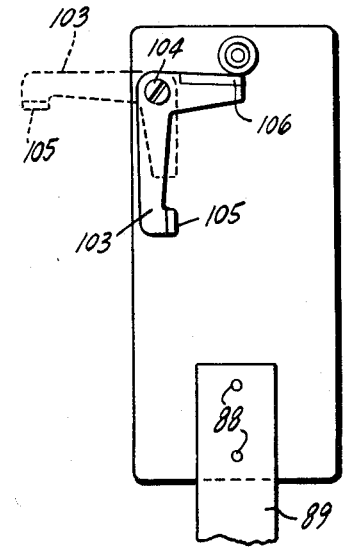

TRAILER HITCH GUIDE ASSEMBLY

BACKGROUND OF THE INVENTION

The present invention relates to vehicle-guiding devices, and is more particularly concerned with such a device which may be utilized in assisting the operator of a towing vehicle in coupling the hitch member of the vehicle to the complementary hitch member of a trailer.

The connecting of the ball and socket joint between a towing vehicle and a trailer, such as a house trailer or a travel trailer, is always a difficult procedure normally requiring the attention of two people, one to operate the towing vehicle, as for example an automobile, and the other one to stand opposite the ball and socket hitch to indicate to the driver which way he should maneuver the front wheels of the towing vehicle in order to move the ball and socket members toward each other and when to stop the vehicle to place the hitch members in superposition. When such an additional person is not available, the problems of the operator increase appreciably, and a considerable amount of back and forth maneuvering is generally necessary before the components of the hitching apparatus are properly aligned and superposed for proper coupling. Alignment devices have been disclosed for assisting the towing vehicle operator in the alignment procedure. However, such devices have generally been too costly and complex, or have not provided satisfactory operation. Even where such devices have provided suitable directional alignment, they have been deficient in failing to indicate with the necessary precision and discernibility when the complementary members of the hitch are vertically superposed.

SUMMARY OF THE INVENTION

Accordingly, it is an object of the present invention to provide a guide means for assisting the operator of a towing vehicle in maneuvering the vehicle in order to place the respective hitch members of the towing vehicle and the trailer to which it is to be connected, in proper alignment for connection.

It is another object of the invention to provide a device of the type described which is self-contained, readily portable, and which may be easily and quickly mounted on a vehicle and trailer for use in coupling the two together, and then readily removed after such coupling has been accomplished.

It is still another object of the invention to provide a trailer hitch guide which may be utilized by the operator alone without the need for assistance by another person in aligning the ball and socket for connecting together.

It is a further object to provide a hitch guide which may be properly adjusted to compensate for abnormal conditions, as for example when the automobile or trailer is positioned on a sloping surface.

It is still another object to provide a hitch guide device which has means provided for producing a readily discernible signal when the hitch members of the vehicle and the trailer are directly superposed and ready for connecting together.

Still further objects and advantages of the invention will appear as the description proceeds.

To the accomplishment of the foregoing and related ends, the invention, then, consists of a useful alignment guide for trailer hitches herein fully described and particularly pointed out in the claims, the annexed drawings, and the following description setting forth in detail certain illustrative embodiments of the invention, such disclosed embodiments illustrating, however, several of the various ways in which the principle of the invention may be utilized.

BRIEF DESCRIPTION OF THE DRAWINGS

In the annexed drawings:

FIG. 1 is a side elevational view showing the hitch guide members of the present invention mounted on the complementary portions carrying the ball and socket of a trailer hitch, the guide members being separated and the hitch members being in uncoupled position.

FIG. 2 is a side elevation of the device shown in FIG. 1 with the guide members aligned in position indicating that the ball and socket members of the hitch are superposed ready for coupling.

FIG. 3 is a side elevation of the motor vehicle mounting guide member in condition for adjusting the position sighting ball.

FIG. 4 is an enlarged fragmentary side elevational view, partly in cross-section, of the signaling portion of the trailer mounting guide members shown in FIG. 2.

FIG. 5 is an enlarged fragmentary top view taken at the line V—V of FIG. 1, looking in the direction of the arrows.

FIG. 6 is a cross-sectional view taken at the line VI—VI of FIG. 1, looking in the direction of the arrows.

FIG. 7 is a fragmentary front elevational view taken at the line VII—VII of FIG. 5, looking in the direction of the arrows.

FIG. 8 is a fragmentary rear view taken at the line VIII—VIII of FIG. 5, looking in the direction of the arrows.

FIG. 9 is a fragmentary view partially in cross-section, taken at the line IX—IX of FIG. 2, looking in the direction of the arrows; and FIG. 10 is an enlarged fragmentary rear view taken at the line X—X of FIG. 2, looking in the direction of the arrows.

DESCRIPTION OF THE SPECIFIC EMBODIMENTS

Referring to FIG. 1, a hitch guide 10 according to the invention is shown comprising a tow vehicle mounting member 11 and a trailer mounting member 12. The tow vehicle mounting member 11 is affixed to the flange 13 of a towing arm 14 by means of a ball member 15 having a bolt 16 and nut 17, the bolt 16 and nut 17 affixing the mounting member 11 to the flange 13. The trailer mounting member 12 is mounted on the jack housing 17 of a trailer. The lower portion of the tow vehicle mounting member 11 has a mounting plate 18 which is permanently clamped between the ball member 15 and the flange 13. The mounting plate 18, FIG. 9, is provided with lateral flanges or ways 19 and 20 and a rectangular opening 21 intermediate the lateral flanges 19 and 20. The detachable portion of the mounting member 11 comprises an L-bracket 22 having a horizontal foot 23 and a vertical supporting member 24. The foot 23 is detachably mounted on the mounting plate 18 between the vertically directed lateral flanges or ways 19 and 20. The foot 23 is cut by a three-sided or U-shaped cut to provide a depending tongue or hook 25 which is bent downwardly and pointed rearwardly. When the foot 23 is placed on the mounting plate 18, the hook 25 extends through the rectangular opening 21. The foot 23 is then locked in place by moving it rearwardly so that the hook 25 engages the underside of the mounting plate 18, and the foot 23 becomes positively clamped to the mounting plate. The foot is subsequently disconnected by pushing it forward until the hook 25 becomes disengaged from the bottom surface of the mounting plate 18, and is pulled out through the rectangular opening 21. A diagonal brace 26 imparts rigidity to the L-bracket, and is affixed thereto by welding. An L-clamp 27 terminates at one end in a stud 28, FIG. 3, which stud is engaged in a hole 29 in the supporting member 24. A carriage bolt 30 is disposed in a hole provided in the supporting member 24 and in the clamp 27 and is threadedly engaged at its end by a wing nut 31 and washer 32. The inner surfaces at the ends of the vertical support member 24 and the clamp 27 are provided with concave socket member surfaces 33 and 34 cooperating to define a socket in which a ball 35 is disposed. Affixed to the ball 35 is a vertical guide rod 36 having an offset upper end portion 37 with a sighting ball 38 affixed to the end thereof. A plumb bob cord 39 is affixed at one end to the sighting ball 38 and at the other end to a plumb bob 40. A plumb bob holder 41 is affixed to the rod 36 for storing the plumb bob 40. The plumb bob cord is stored by engagement with a hook 42, and a hook 43 connected by means of an elastic cord 44 to a hose clamp 45 which is affixed to the vertical guide rod 36.

The trailer mounting member 12 is adapted to be mounted on the jack housing 17. In order to facilitate the mounting, an adjustable reference clamp 46 may be permanently mounted and, after proper orientation, left permanently on the jack housing. The clamp 46 is provided with a triangular index tab 47 to provide rotative indexing.

The trailer mounting member 12 comprises a U-clamp base 50, a strap 51 is affixed to the base 50 by means of a clamp plate 52 affixed to the base 50 by means of screws and nuts. The other end of the strap 51 engages the transverse member 64 of a toggle clamp lever 53. The lever 53 is provided with studs 54 which engage a pair of latching flanges 55 when the toggle clamp lever 53 is placed in closed position. If adjustment of the strap is desired, a strap using free ends may be utilized, with the ends taped in place when the proper length has been achieved. The U-clamp base 50 is provided at its lower edge with an index notch 48 adapted to engage the index tab 47 of the reference clamp 46.

An angle bracket 56 is affixed to the base 50 by means of rivets 57. A Z-bracket 58, FIGS. 1 and 2, having a lower leg 59 and an upper leg 60 is affixed to the horizontal member of the angle bracket 56 by means of bolts 61 and nuts 62. Elongated slots 63 and 64, FIG. 6, are provided in the angle bracket 56 for lateral adjustment.

An angle contact 66, FIGS. 1 and 2, preferably of aluminum, is affixed to the upper leg 60 by means of a screw 67 and nut 68, FIG. 4, and insulated from the upper leg 60 by means of fiber washers 69 and 70 and an O-ring 71. A battery case 72 is mounted on the bracket 58 by means of a bracket 79, screws 73 and washers 74 in combination with a fiber filler block 75, FIG. 4. A dry cell battery 76 is maintained in the battery case 72 with its positive terminal 77 in contact with the screw 67. The battery is maintained in place and biased in contact with the end of the screw 67 by means of a screw cap 78 and a compression spring (not shown).

An adjustment arm 85 is mounted on the vertical portion of the Z-bracket 58 by means of screws 86. An adjustment screw 87 mounted on the vertical portion of the Z-bracket 58 engages the adjustment arm and provides a means of adjusting the distance between the adjustment arm 85 and the Z-bracket 58. Affixed to the end of the adjustment arm by means of screws 88 is a target or striking plate 89, FIG. 7. The striking plate 89 may be painted any easily discernible color, and is preferably provided with a cross 90 which may be formed by means of white adhesive tape strips or the like. Other means of delineating the center of the striking plate 89 could, of course, be used, for example a target defined by concentric circles (not shown). A suitable pattern for painting the striking plate is shown in FIG. 7, and comprises a red painted area 91 and a green painted area 92.

Mounted at the top of the striking plate 89 is an electrical contact 93, FIGS. 4 and 5, maintained and insulated from the plate by means of a rubber grommet 94 and a fiber washer 95. A sleeve 96 is also mounted on the plate and engages a plastic bulb holder 97 which retains a light bulb 98 with the inner end of the contact 93 and having a compression spring 99 engaging the metal base of the bulb and making contact with the plate 89. A lamp guard 100 affixed to the striking plate 89 by means of support ears 101 and screws 102 (FIGS. 5, 6 and 7) provides protection for the lamp bulb 98. A safety latch 103 (FIG. 8) in the form of a bell crank is pivoted on a screw 104 and is provided with a finger tab 105 and a lamp disabling tab 106 which disables the lamp when the tab 105 is moved, thereby interposing the tab 106 between the end of the leg 60 and striking plate 89.

In mounting the hitch guide of the present invention initially on a particular vehicle, the reference clamp 46 is first properly affixed to the jack housing at the desired height. The U-clamp base 50 is then placed over the jack housing 17 with the index notch 48 engaging the index tab 47 of the clamp 46. The strap 51 is then properly adjusted and the quick-acting toggle clamp lever 53 affixed in place in the latching flanges 55. The tow vehicle mounting member 11 is then mounted on the tow vehicle by removing the ball member 15, placing the mounting plate 18 over the flange 13, inserting the bolt 16 through a hole provided in the plate 18, and securing the assembly by applying and tightening the nut 17. The plate 18 may be left permanently mounted in this position. The foot 24 is then inserted on the mounting plate 18 between the lateral flanges 19 and 20, FIG. 9, and locked in place by the depending hook 25. The plumb bob cord 39, FIG. 2, is then released from the hooks 42 and 43 and permitted to hang freely from the ball 38, FIG. 3. The wing nut 31 is loosened and the guide rod 36 adjusted until the plumb bob 40 hangs directly over the center of the ball 15. The wing nut 31 is then tightened and the plumb bob 40 and cord 39 once again stored by the hooks 42 and 43 and the plumb bob holder 41, FIGS. 1, 2 and 10. To adjust the apparatus initially, the towing vehicle is then backed up properly in position so that the socket 80 of the draw tongue 81 is in position directly over the ball 15, FIG. 2. The nuts 62 are then loosened and the Z-bracket 58 adjusted until the ball 38 engages the striking plate 89 substantially at the center of the cross 90, FIG. 7, and pushes back the striking plate 89 until the lamp contact 93 engages the contact 66 and the lamp lights. The gap distance between the lamp contact 93 and the contact 66 can be adjusted by means of the screw 87.

Once the guide members are properly adjusted, subsequent mounting and coupling of the hitch members are greatly simplified. The trailer mounting guide member may be quickly mounted onto the jack housing and properly referenced by engaging the index tab 47 with the index notch 48. The striking plate will now be in proper position. The towing vehicle member is then mounted onto the mounting plate, which references the guide into proper position when the trailer and tow vehicle are both on level ground. If not, the plumb bob is taken out of storage and the guide readjusted so that the sighting ball 38 is directly over the hitch ball 15. The plumb bob is then stored and the operator then backs up the towing vehicle while sighting the sighting ball 38 against the center of the cross on the striking plate 89. He continues until the lamp 98 lights up indicating superposition of the hitch members. The longitudinal distance between the ball 15 and the striking plate is more difficult to judge from the operator's position in the towing vehicle. This judgment is simplified by the fact that the operator need only continue backing up in the proper direction until the lamp 98 lights up. Instead of a lamp, a buzzer or any other discernible signal-producing means (not shown) may be used to indicate the striking of the target strike plate by the sighting ball.

Once the alignment process has been completed, the mounting member 11 may be readily disconnected from the mounting plate 18 and stored. The trailer mounting member 12 may also be readily removed by disengaging the toggle clamp 53 and disengaging the strap. The safety latch 103, FIGS. 1, 2 and 8, is then rotated to the lamp disabling position to prevent the battery from becoming discharged during storage between times of use.

The hitch guide of the present invention has many advantages over the prior art devices designed for the same general purpose. First, the towing vehicle member and trailer member may be readily attached and dismounted, and, once they have been properly adjusted, may be remounted without further adjustment. This is made possible by the mounting plate 18 which remains permanently affixed and reference clamp 46, which may also be left permanently affixed. The towing vehicle member is provided with a sighting ball which may be readily adjusted by means of a self-contained plumb bob assembly so that it is directly superposed over the ball member 15 of the hitch. The trailer mounting member is readily attached by a strap-type quick-acting toggle clamp to fasten the unit to the jack post. An adjustable reference clamp is provided which, after adjustment, permits rapid mounting of the member and obviates the need for additional adjustment with each mounting of the member. The member is adjustable to vary the distance between the striking plate 89 and the sighting ball 38, and additionally contains a readily discernible target for aligning the sighting ball 38. Additionally, precise judgment of the distance between the sighting ball and the target is not required since the lamp contained on the striking plate lights up when the sighting ball engages the striking plate, indicating to the operator that the vehicle is in proper position for coupling the hitch. Also the device is relatively simple to manufacture from standard available materials, is relatively inexpensive, and is simple to operate even by a novice.

While only a single embodiment of the invention has been shown and described, other equivalent forms will now be apparent to those skilled in the art. Therefore, the embodiments shown in the drawings are merely diagrammatic and for illustrative purposes, and are not intended to limit the spirit and scope of the invention as above described and illustrated in the drawings. It is further to be noted that while directional terms have been used, same are not to be construed as a limitation of the invention since such use has been availed of to better describe the invention in the various positions shown in the drawings.

Other modes of applying the principle of my invention may be employed instead of those explained, change being made as regards the means and the method herein disclosed, provided those stated by any of the following claims or their equivalent be employed.

I therefore particularly point out and distinctly claim as my invention:

1. A device for assisting the operator of a tow vehicle in coupling the ball and socket members of a trailer hitch by enabling the operator to direct the towing vehicle toward the trailer hitch and by indicating when the socket mounted on the tongue of the trailer is superposed over the ball mounted on the towing vehicle, which comprises:

a. a towing vehicle mounting indicating member adapted to be vertically mounted in fixed relationship to said ball,
  b. said vehicle mounting member including sighting means at one end thereof and adjustable means for positioning said sighting means properly with respect to said ball,
  c. a trailer mounting indicating member adapted to be vertically mounted in fixed relationship to said socket,
  d. said trailer mounting indicating member including a first vertical arm, a second arm affixed to and extending forwardly and upwardly from said first vertical arm and a target member mounted at the end of the second arm,
  e. said second arm being movable in a forward and rearward direction with respect to said first vertical arm,
  f. means for adjusting said trailer mounting indicator member to place the target member over the socket in proper position to be engaged by said sighting means, and
  g. means for providing a signal when said sighting means engages said target member thereby indicating to the operator that said socket is superposed over said ball, h. said signal providing means comprising an electrical circuit including an electrical current source, an electrical switch adapted to be actuated by rearward movement of said target member with respect to said first vertical arm, and an electrically operated signal means adapted to provide a signal when said switch is actuated.

2. A device according to claim 1 wherein said signal means comprises an electric lamp and means for electrically connecting said lamp to said source, and the electrical switch is adapted to close the circuit between said lamp and said source when said target member is engaged by said sighting means.

3. A device according to claim 1, wherein said adjustable means for positioning said sighting means with respect to said ball comprises a plumb bob cord connected at one end to said sighting means and having a plumb bob connected to the other end thereof, and means for storing said plumb bob and cord.

4. A device according to claim 1, wherein said means for adjustably positioning said sighting means with respect to said ball comprises a ball and socket joint.

5. A device according to claim 1, wherein said towing vehicle mounting indicating member comprises a plate adapted to be permanently mounted below the ball of said hitch and being provided with lateral guides in a central locking aperture, said towing vehicle mounting indicating member being provided at its end with a tab adapted to seat between said lateral guides, and releasable hook means adapted to engage said aperture whereby said towing vehicle mounting indicating member may be quickly mounted or removed from said vehicle.

6. A device according to claim 1, wherein said target member is provided with a cross, the center of which indicates the proper position for engagement by said sighting means.

7. A device according to claim 1, wherein said trailer mounting indicating member comprises a battery and electrical contact means mounted at the end of said first vertical arm a light bulb mounted on said target member, the arrangement being such that when said target member is moved rearwardly by said sighting means, a terminal of said light bulb engages said electrical contact, thereby closing the circuit and energizing said light bulb.

* * * * *